Figure 1:
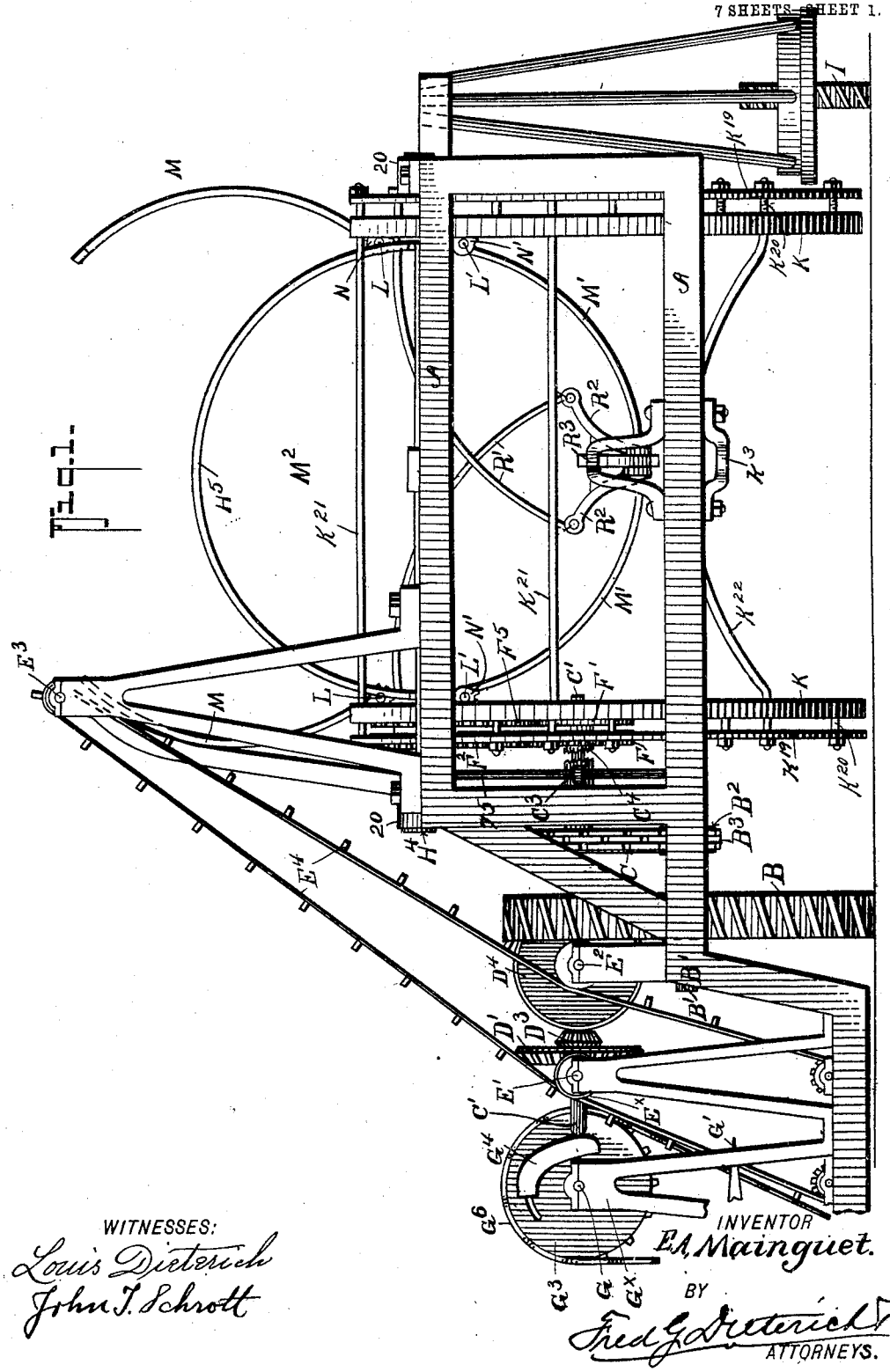

No. 796,587. PATENTED AUG. 8, 1905.
E. A. MAINGUET.
GRAIN SHOCKING MACHINE.
APPLICATION FILED MAR. 11, 1903.

7 SHEETS—SHEET 1.

WITNESSES:
Louis Dieterich
John T. Schrott

INVENTOR
E. A. Mainguet.
BY
Fred G. Dieterich
ATTORNEYS.

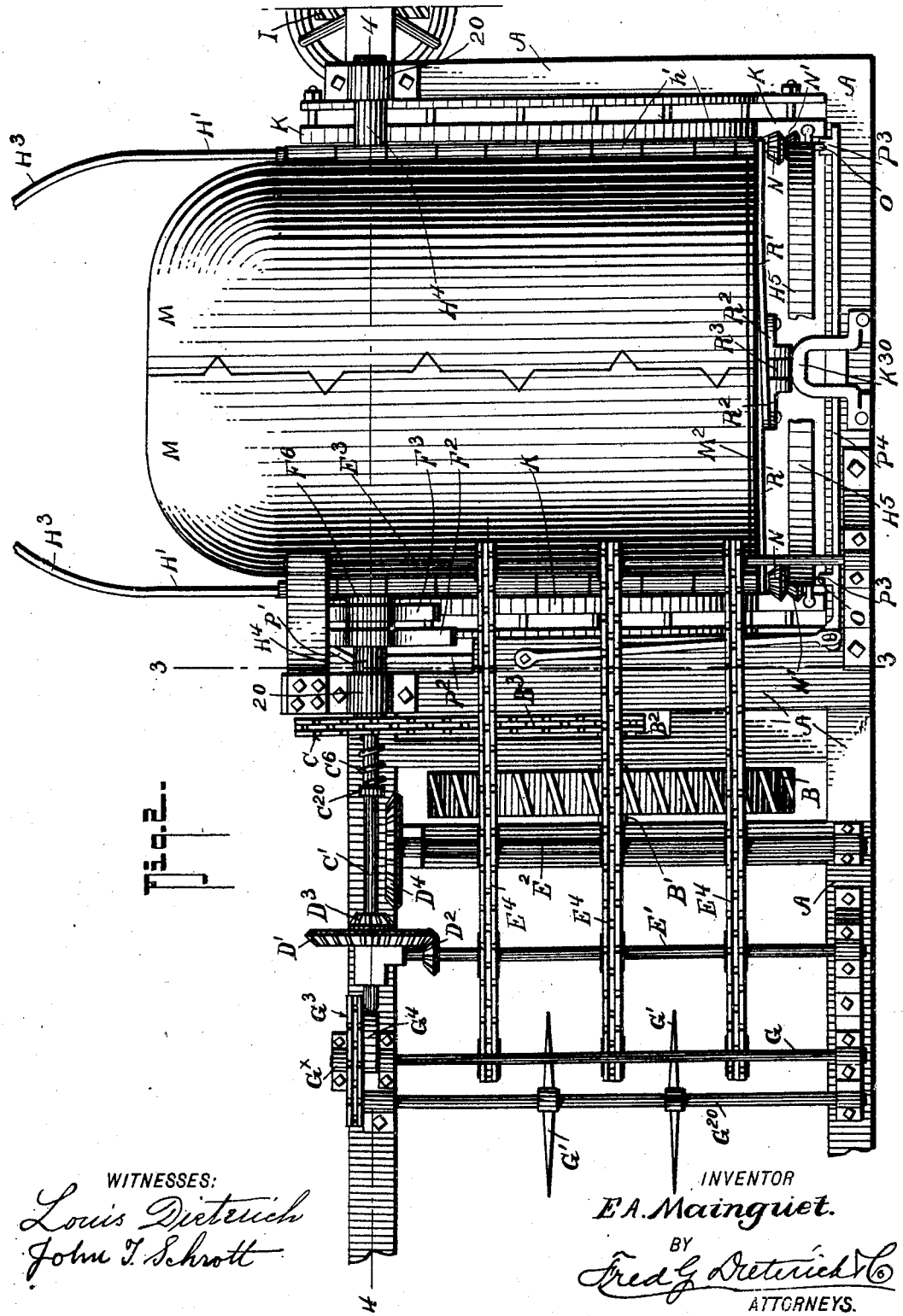

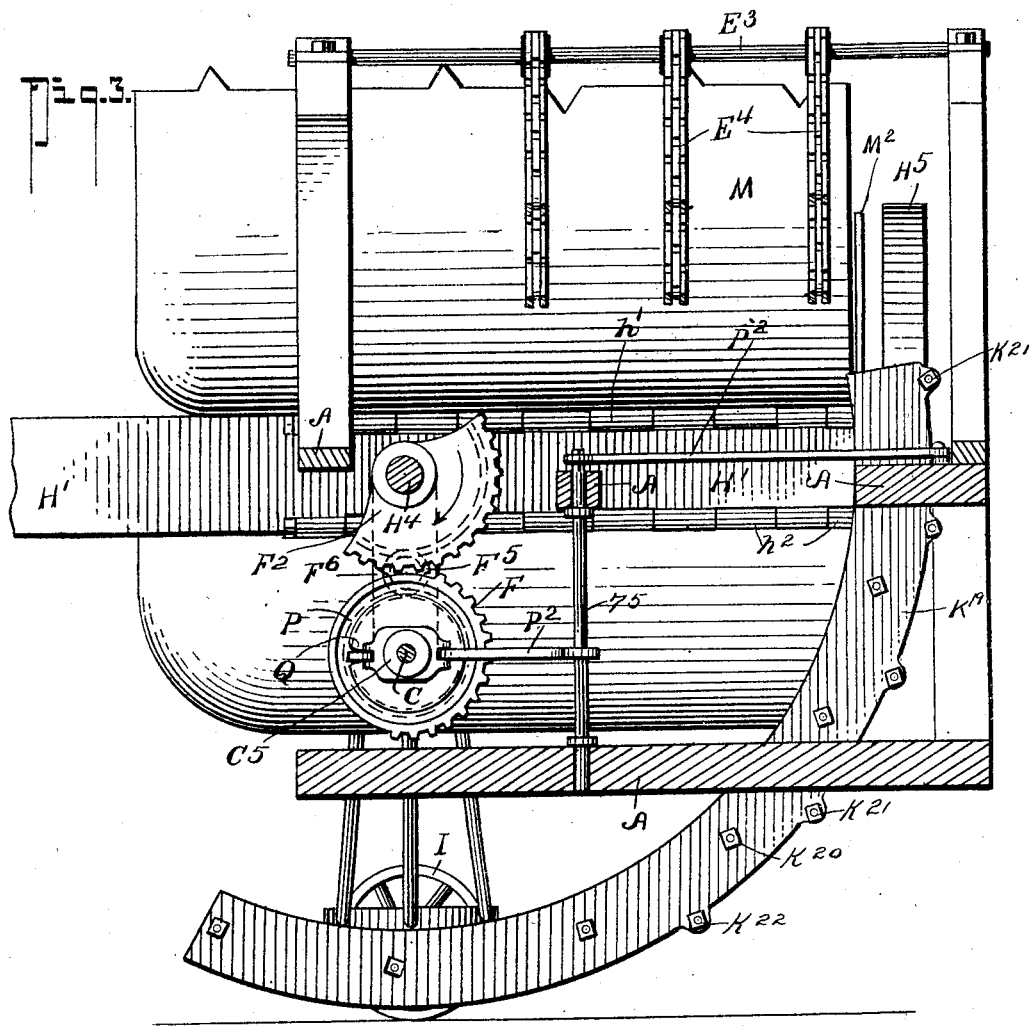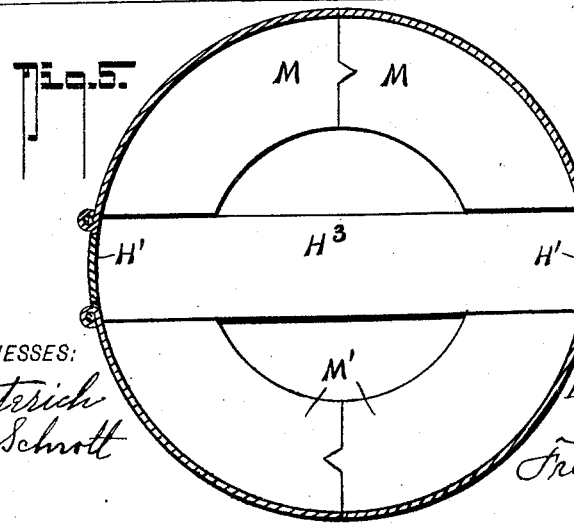

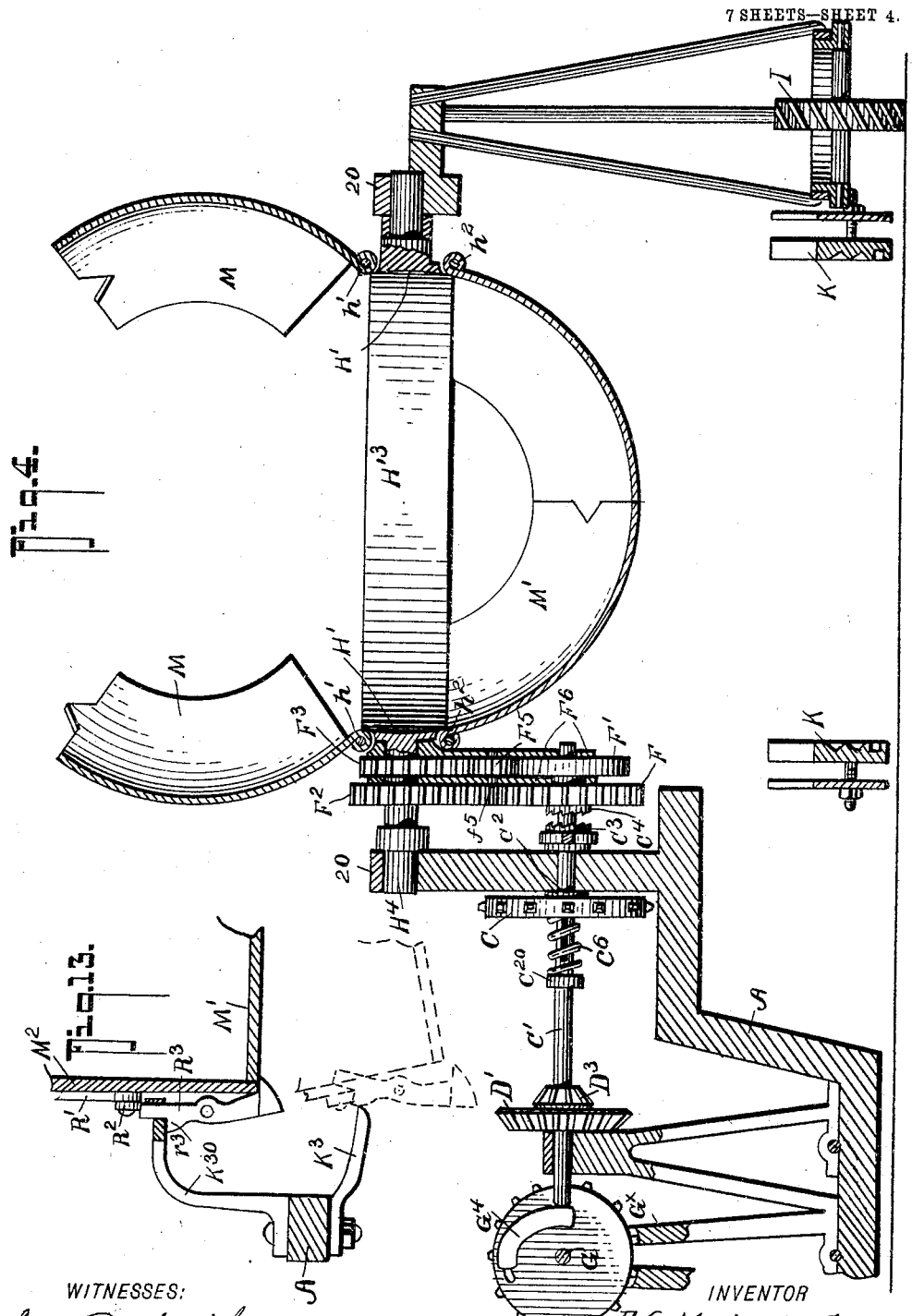

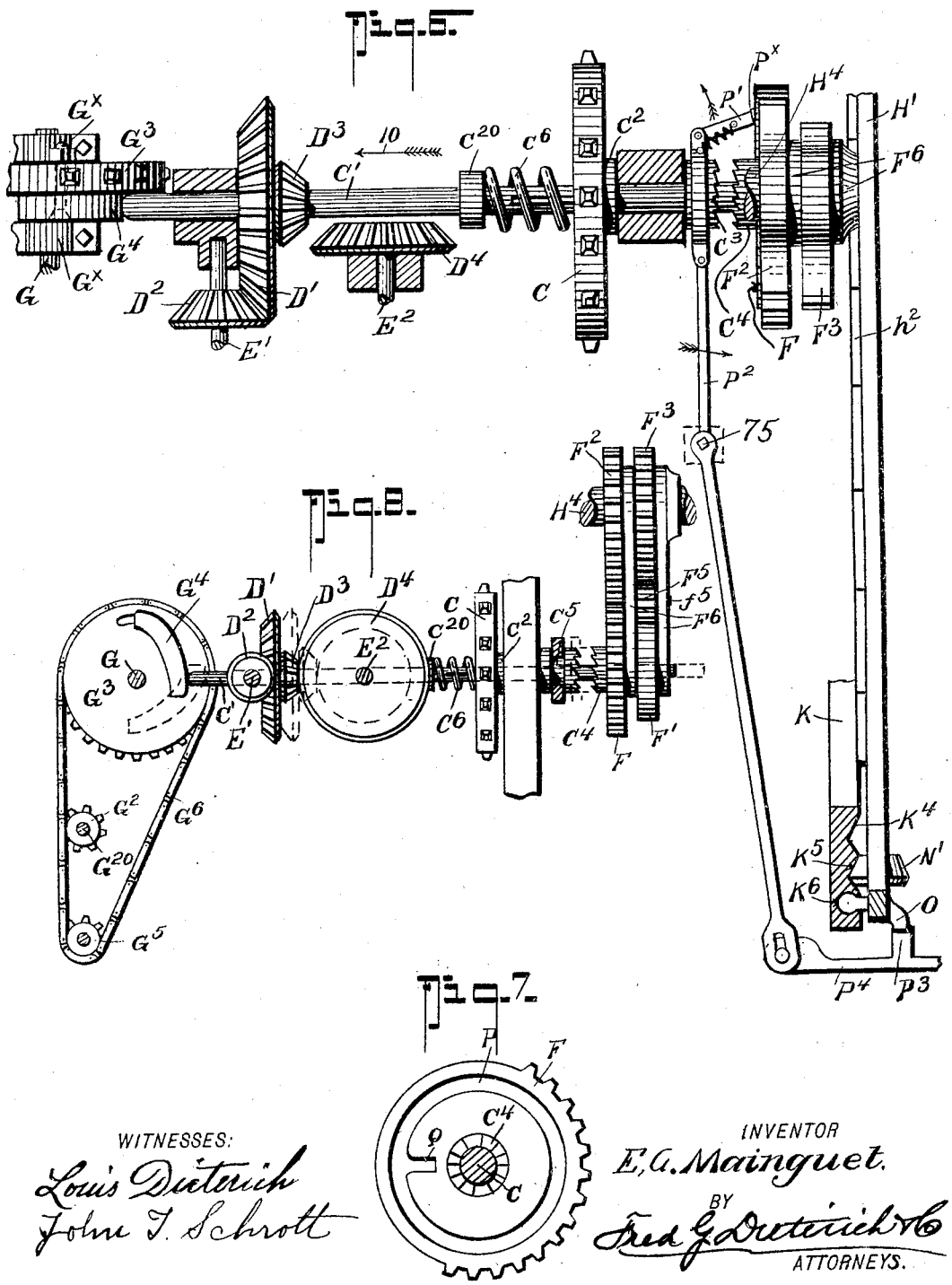

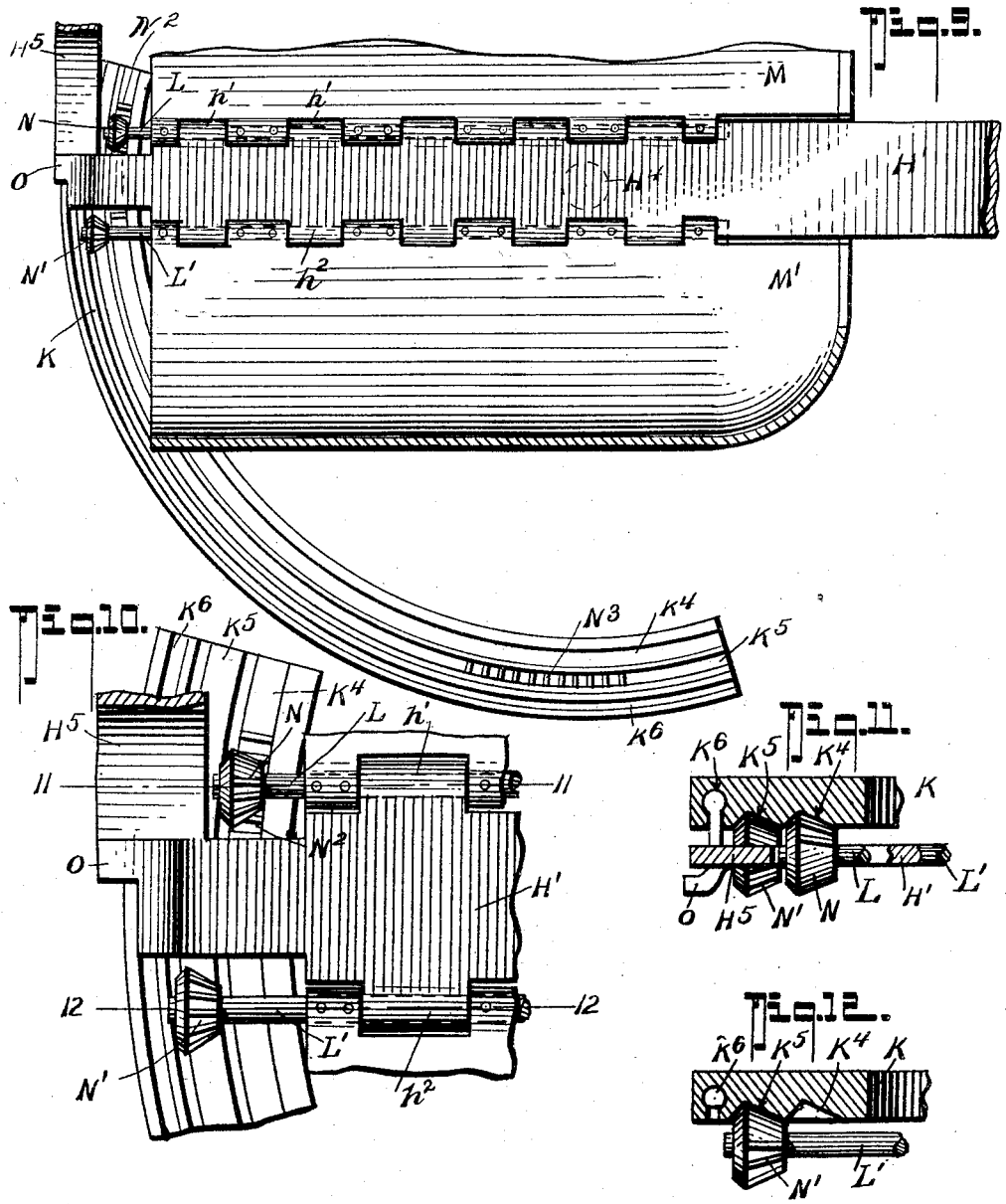

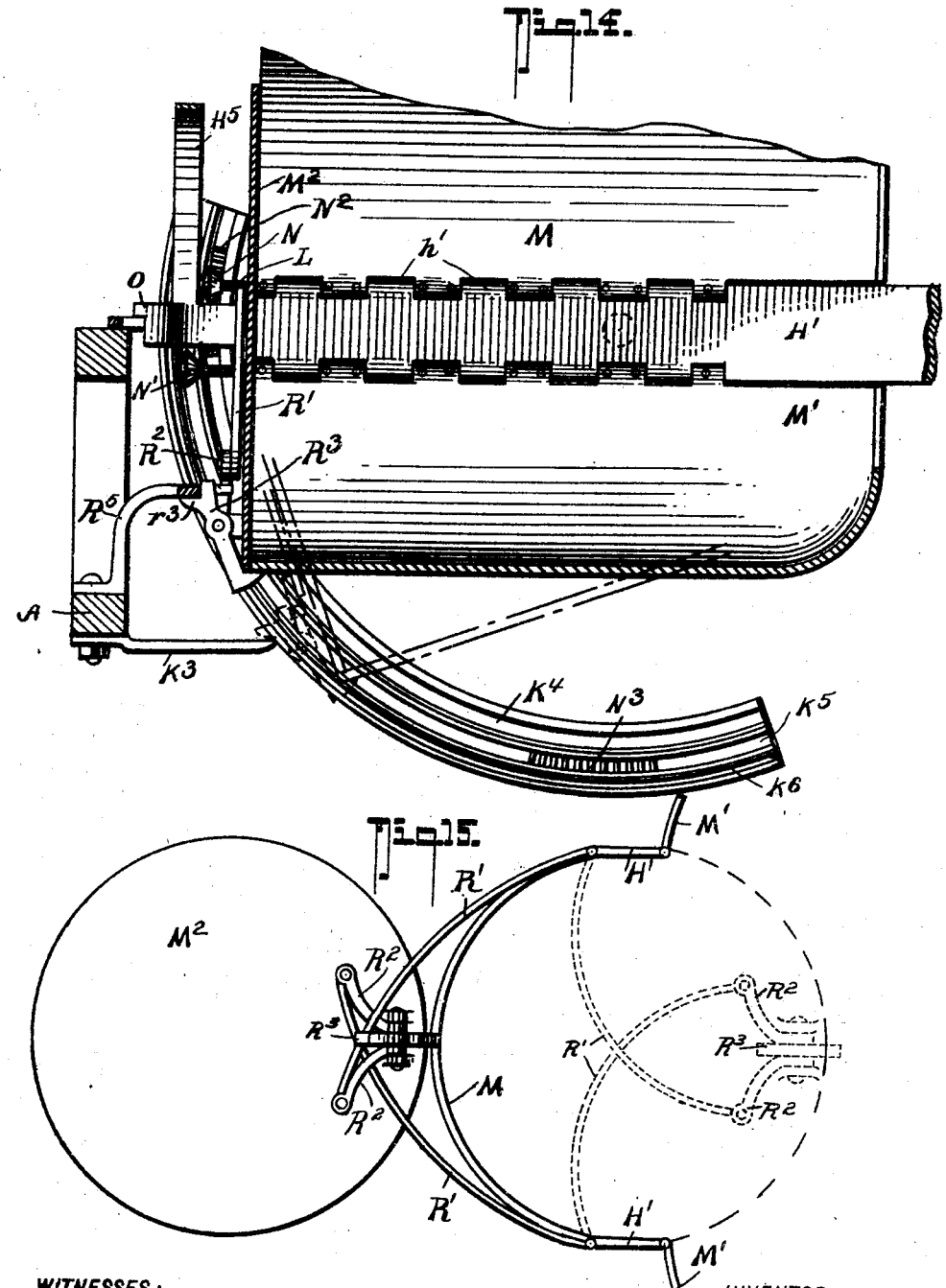

UNITED STATES PATENT OFFICE.

EDWARD A. MAINGUET, OF EVANGELINE, LOUISIANA.

GRAIN-SHOCKING MACHINE.

No. 796,587.  Specification of Letters Patent.  Patented Aug. 8, 1905.

Application filed March 11, 1903. Serial No. 147,330.

*To all whom it may concern:*

Be it known that I, EDWARD A. MAINGUET, residing at Evangeline, in the parish of Acadia and State of Louisiana, have invented a new and Improved Grain-Shocking Machine, of which the following is a specification.

My present invention is in the nature of an improved grain-shocking apparatus especially designed to shock long or short grain or corn with the same ease and effectiveness and which will leave the sheaves standing practically in the form of a shock.

Among the essential advantages of my construction is the providing of a bundle-receiver which automatically oscillates first to its vertical position with the discharge-gates opened and which gates are temporarily held open as the machine passes from the standing shock and then automatically close as the receiver returns to its horizontal position. Another essential feature lies in the means for intermittently oscillating the bundle-receiver, which is controlled by the continuous rotating shaft driven by the ground-wheel.

My invention consists in the improved combination, correlative arrangement, and detailed construction of parts hereinafter fully described, and specifically pointed out in the appended claims, reference being had to the accompanying drawings, in which—

Figure 1 is a front view of my improved construction of shocking-machine. Fig. 2 is a top plan view thereof. Fig. 3 is a longitudinal section of the same, taken practically on the line 3 3 of Fig. 2. Fig. 4 is a transverse section thereof on the line 4 4 of Fig. 2. Fig. 5 is a cross-section of the bundle-receptacle with the automatically-operating gates. Fig. 6 is a detail plan view of a portion of the receptacle-gates-operating mechanism and the trip-lever devices which coact therewith. Fig. 7 is a face view of the gear-wheel F, hereinafter referred to. Fig. 8 is a detail view of the clutch-equipped gear-carrying shaft and the means for intermittently shifting the said shaft. Fig. 9 is a side elevation of the segmental rack and the pinions and shafts that engage therewith. Fig. 10 is an enlarged view of a portion thereof. Figs. 11 and 12 are detail sections on lines 11 11 and 12 12 of Fig. 10. Fig. 13 is a detail view of the locking devices hereinafter referred to; and Fig. 14 is a detail sectional view, and Fig. 15 a detail diagrammatic view, illustrating a supplemental gate mechanism for holding the bundles that pass into the receptacle H from falling down before a predetermined time.

In the accompanying drawings I have illustrated my shocking-machine with a low-down binder; but I desire it understood that the same can be applied to the ordinary types of elevator-equipped machines in general use.

Referring now to the details of construction, A designates the main or stationary frame of the shocking apparatus, mounted at one side on the usual form of ground-wheel B and at the other side on a single caster-wheel I, suitably connected with the main frame in a manner to balance the same during any position of the receptacle presently referred to, said arrangement of the single caster-wheel serving also to relieve the draft-pole or tongue of undue weight.

On the inner end of the shaft $B'$, that carries the ground-wheel B, is mounted a sprocket-wheel $B^2$, over which takes a sprocket-chain $B^3$, which engages a large sprocket-wheel C on a shaft $C'$, parallel with the shaft $B'$, but in a plane above said shaft, as clearly shown in Fig. 1, by reference to which and to Figs. 6 and 8 it will be noticed upon the shaft $C'$ is mounted a compound bevel-gear, fixed on the said shaft $C'$ and rotatable therewith and which comprises a large bevel-disk $D'$ and a smaller bevel-disk $D^3$, which is joined with the disk $D'$, so the two disks $D'$ and $D^3$ will be moved and rotated in unison, and the said disks $D'$ and $D^3$ are so arranged that the disk $D'$ will first mesh with a gear-wheel $D^2$, and upon the shifting of the gears the gear $D^3$ will mesh with a bevel-gear $D^4$, mounted on the end of the shaft $E^2$, disposed in a horizontal plane of the shaft $C'$ and extending forwardly therefrom at right angles thereto and at right angles to the gear $D^3$. The larger gear $D'$ is intended to impart a high speed to the shaft $E'$ and the gear $D^3$ a slow speed to the shaft $E^2$, it being understood that the said gears $D'$ and $D^3$ operate alternately. When the disk $D'$ is in mesh with the gear $D^2$, speed is imparted to the shaft $E'$, which conveys rapid motion to the conveyer-chain $E^4$, it being understood that this takes place when the receptacle is in the position for receiving the sheaves, while when the disk $D^3$ is in mesh with gear $D^4$ it will impart motion to the shaft $E^2$ and the conveyer-chain $E^4$ at a slow speed during the dumping operation of the receptacle.

The gears $D^2$ and $D^4$ are arranged to impart the variable-speed movement to the shafts $E'$ and $E^2$, which coact with the pulleys $E^\times$ and the gripping-chains $E^4$ mounted thereon, the different shafts $E'$, $E^2$, and $E^3$ and the chains operating to convey the bundles from the ejector into the receiver or receptacle H, presently referred to.

The sheaves-ejecting device is on the main frame at a point beyond the outer side of the ground-wheel B, and the said mechanism comprises a shaft G, mounted on the suitable end bearings $G^\times$ and which carries at the inner end a chain-wheel $G^3$, provided with an adjustable pusher-block $G^4$, the purpose of which will presently appear.

$G^5$ designates a small sprocket-wheel journaled on a stub-shaft mounted on the main frame, and the said wheel $G^5$ is in the vertical plane of the wheels $G^2$ $G^3$, and around it and the wheel $G^3$ passes an endless drive-chain $G^6$, which also engages a sprocket-wheel $G^2$, disposed intermediate the gears $G^3$ and $G^5$ and mounted on a shaft $G^{20}$, which extends across the machine in a plane parallel with the shaft G, and the said shaft $G^{20}$ carries a series of oppositely-projecting fingers $G'$, which rotate with it and serve to eject the bundles on the elevator devices previously referred to, it being proper to here state that at each ejection of a bundle the sprocket-wheel $G^2$ is given a partial rotation and through the medium of the chain $C^6$ imparts a proper revolution to the gear $G^3$, and at each complete revolution of said wheel $G^3$ its adjustable block $G^4$ is brought into engagement with certain clutch mechanism which controls the means that operates the opening and closing of the receptacle H, all of which will hereinafter be more fully explained.

The wheel C on the shaft $C'$ is always held in alinement with the sprocket-wheel $B^2$; but it is loosely mounted upon the shaft $C'$ and held to rotate therewith by means of a key fixed to the said shaft $C'$. To always maintain the wheel C in proper alinement with the sprocket-wheel $B^2$ and prevent its lateral movement with respect to said sprocket-wheel $B^2$, I provide a collar $C^2$ on one side of the wheel C and a spring $C^6$, held between the other side of the wheel C and a collar $C^{20}$, fixedly secured to the shaft $C'$. Referring to Figs. 3 and 6, it will be seen I provide a vertical shaft 75, which has attached a pair of crank-arms $P^2$, one of which is coöperatively connected with a groove $C^5$ in the clutch-collar $C^3$, while the other one of the crank-arms $P^2$ engages with the lock-bar devices $P^4$, as will be presently explained.

$P'$ indicates a short catch for engaging with the groove P in the mutilated gear F, the catch $P'$ and the crank-arms $P^2$ being so arranged that the shifting of the shaft $C'$, carrying with it the clutch-collar $C^3$, will serve to operate the catch $P'$ and the arms $P^2$, for a purpose presently explained.

On the inner end of the shaft $C'$ is fixedly mounted a clutch member $C^3$, having an annular groove $C^5$, and between the collar $C^{20}$, fixed to the shaft $C'$ and the sprocket-wheel C, is a spring $C^6$, which normally holds the shaft $C'$ outward in the direction of the arrow 10 and releases the clutch $C^3$ from an opposing clutch-sleeve $C^4$, which is loosely mounted upon the inner end of the shaft $C'$ and which has integrally formed therewith or fixedly attached thereto a mutilated gear F and a second mutilated gear $F'$, and in the sleeve $C^4$ slides and rotates the shaft $C'$, as clearly understood by referring to Figs. 6 and 8 of the drawings, by reference to which it will also be noticed a series of lever members $P'$, $P^2$, and $P^4$ join with each other and are coöperatively connected with the groove $C^5$ in the clutch-collar $C^3$ in such manner that the inward shifting of the shaft $C'$ acts upon the said levers in a manner and for a purpose which will presently appear.

By referring now to Fig. 7 it will be noticed the gear F has an annular groove P and a radial notch Q, that communicates with the said groove, which notch at predetermined times receives a locking-lug $P^\times$ on the outer end of the catch $P'$, whereby to lock the wheel F from rotation.

When the shaft $C'$ is moved inwardly to bring the clutches $C^3$ and $C^4$ into engagement, the catch $P'$ is shifted to release its lug $P^\times$ from the notch Q and cause it to ride in the annular groove P and permit the wheel F to revolve, which has motion imparted to it from the shaft $C'$ when the clutches $C^3$ and $C^4$ engage.

A rod $P^4$ is mounted transversely on the receptacle H, and it has stops $P^3$ $P^3$, which coact with members O O on the ends of the bars $H'$, which form a part of the mechanism for controlling the opening and closing of the gates M $M'$ of the receptacle H and holds the said shaft and the parts combined therewith from operation and the receptacle H from rocking upon its axis until the shaft $C'$ is moved inwardly at predetermined times, when the said stops $P^3$ will be moved from engagement with the members O O, (see Fig. 6,) and thereby leave the shafts L $L'$ free to operate and the receptacle H to rock on its axis, as will presently more fully appear.

When the catch $P'$ is shifted in the manner stated, the wheels F and $F'$ will be free to turn, it being obvious that by reason of the groove P and the notch Q that when the said notch Q comes into register with the lug $P^\times$ the said lug will be slid into engagement with the notch Q by the pull-back tension of the spring $C^6$, which under the said conditions will shift the shaft $C'$ outwardly, and thereby release the clutches $C^3$ and $C^4$.

The wheel F meshes with the mutilated gear $F^2$, mounted on the stub-axle $H^4$, which forms a part of the receptacle H, and the wheel $F'$ meshes with an idler-gear $F^5$ on a stub-shaft $f^5$, mounted in hangers $F^6$, pendent from the axle $H^4$, and the said idler $F^5$ meshes with a mutilated gear-wheel $F^3$, also fixedly joined with the axle $H^4$, as shown.

The mutilated gears F F' have alternate smooth and gear peripheral portions, and the said smooth portions of the said gears F F' are so arranged whereby one of the gears $F^2$ $F^3$ is in mesh with the gear portion of one of the mutilated gears F F', while the other one of the gears $F^2$ $F^3$ is out of mesh with the gear portion of the other one of the mutilated gears F F', whereby but one set of gears F $F^2$ or F' $F^5$ $F^3$ will be in an operative connection at a time. By referring now more particularly to Figs. 3, 4, 6, and 8 it will be noticed that when the mutilated gear-wheel F has its gear-surface in mesh with the gear $F^2$ the shaft $H^4$ will be rotated in the direction of the arrow on the gear $F^2$, Fig. 3, to dump the receptacle. While this operation is taking place, the smooth surface of the mutilated gear F' will be in engagement with the gear $F^5$ and will therefore not operate the said gear $F^5$. Now when the receptacle has been dumped the smooth surface of the mutilated gear F will come into engagement with the gear $F^2$, while the gear-surface of the mutilated gear F' will come into engagement with the gear $F^5$, and thereby impart motion to the gear $F^3$ and shaft $H^4$ in the direction reverse to that indicated by the arrow on the gear $F^2$ in Fig. 3 and return the receptacle to its horizontal position, it being understood that this correlative operation is performed for each dumping of the receptacle.

It should be further understood that the gear and smooth portions of the mutilated gears F F' are so arranged that the gear portion of one of the mutilated gears F F' is released from engagement with its coöperating gear $F^2$ or $F^5$ slightly before the gear portion of the other one of the mutilated gears F F' engages with its coöperating gear $F^2$ or $F^5$, as the case may be, whereby the receptacle when in its vertical position will remain stationary long enough for the machine to move a slight distance to bring its receptacle away from the standing shock and also when the receptacle is in its horizontal position to leave it in said position until filled.

Referring now more particularly to the construction of the receptacle H, its manner of operation, and the actuating means controlling the opening and closing of the gates M M', attention is called to Figs. 1, 2, and 13, which illustrate the said parts in detail and by reference to which it will be noticed the receptacle H is composed of two main parallel bars H', rigidly connected to the stud-axles $H^4$ $H^4$, held to rock in bearings 20 20, extended up from the main frame, and the said bars H' at one end merge with an arched portion $H^3$, and they have their opposite ends joined by an arched member $H^5$. On the edges of the side bars H' are formed a series of bearings $h'$ and $h^2$, in the ones $h'$ of which at each side are journaled shafts L, and in the ones $h^2$ at each side are journaled shafts L', and to the shafts L are fixedly joined the gates M M, hereinafter termed the "upper" gates, and to the shafts L' are fixedly connected the lower gates M' M', and on the lower end of each of the shafts L L' are affixed the beveled gears N N', formed with alternately-arranged smooth and toothed portions, as shown, for coacting with a pair of outwardly-extending rack-guides K K, which curve inwardly on an arc having the axis of the receptacle H as a center. The racks K K have three separated but parallel-disposed ways (designated $K^4$, $K^5$, and $K^6$) on which the ones $K^4$ are arranged to coact with the bevel-gears N, the ones $K^5$ with the gears N', and the ones $K^6$ to form grooved guides for the extremities of the side bars H', which slide in said grooves when the receptacle H is oscillated.

It will be noticed by referring to Figs. 9, 10 that the ways $K^4$ have toothed portions $N^2$ at their upper end extending downwardly a short distance and the ways $K^5$ have similar toothed portions $N^3$ at their lower end, which extend a short distance backwardly. Now by bearing in mind that the gears N N' have alternate smooth and toothed portions the manner in which they coöperate with the racks K and the opening and closing of the gates M M' is accomplished as follows: When dropping the receptacle, which is intermittently effected by the action of the mechanism under control of shaft C', the gear N will first engage the teeth $N^2$ and be partially rotated to close the gates M M, secured to the shaft L L, and to exert a final pressure by arranging the gates M M in such juxtaposition that when closed they will bear downwardly upon the contents of the receptacle, it being understood that when the above action of closing the gates M M occurs the gates M' M' are held closed. After the gears N have made a partial rotation to close the gates M M their smooth surfaces contact with the smooth part of the ways $K^4$, and thereby hold the gates M M in a closed position while the receptacle is being brought to its vertical position and passes back to its horizontal position. When the receptacle H reaches near the vertical position, the gears N' engage the toothed portions $N^3$, and they, with their shafts L' L', partially rotate to bring the gates M' M' to an open position. The receptacle H after it is brought to its vertical position is held at such position a short while before it begins to oscillate back to its horizontal position, whereby to allow the machine to pass forward a sufficient space to leave the standing shock before the closure of the gates M' M' occurs, which begins as soon as the receptacle starts on its reverse movement by reason of the gears N' N', which now engage the rack portions N³ N³, being rotated in a reverse direction to close the gates M' M'. As soon as such action is completed the smooth surfaces of the gears N' engage the smooth portions of the ways K⁵, thus holding the gates M' M' locked until the receptacle again assumes a vertical position. As the gates M M on the reverse or up movement of the receptacle H remained closed, it is proper to state that when the said receptacle about reaches its horizontal plane the gears N within engage the rack portions N² and are then rotated in a direction reverse to that in which they last rotated, whereby to bring the gates M M to an open position. The projections O, that engage the blocks P³ on the lever P⁴, before described, hold the front end of the receptacle H from dropping until at proper predetermined times.

In Figs. 14, 15 is illustrated in detail supplemental means for sustaining the bundles within the receptacle and preventing them from falling down before the proper predetermined times. The said means comprises a flat platform M², two spring members R', fixedly connected at one end to the inner sides of the bars H' (see Fig. 14) and whose other ends are loosely joined with the rods R² R², fixed loosely to the lower part of the bottom gate or platform M². A lock or pawl R³, carried by the members R², is mounted upon the gate M² in such manner that when the said lock or pawl R³ is pressed down and released from the edge of the gates M', which is done when said pawl passes down over a stud bolt or arm K³, the spring members R' will then move the pawl R³ and the gate M² out of alinement with the bottom of the receptacle (see Fig. 15) to permit the ready discharge of the shock. In returning to the horizontal position the shoulder $r^3$ of the pawl R³ will engage the bracket R⁵, fixed, by preference, onto the frame A, and thereby hold the pawl and gate M² stationary until the bundle-receiver reaches its horizontal position, when the pawl R³ will again lock the gates M' and M² together, it being understood the shoulder $r^3$ of the pawl R³ does not engage the bracket R⁵ until the bundle-receptacle has begun its return movement, and as the receptacle is moving toward its horizontal position and the catch R³ is in engagement with the bracket R⁵ the tension of the springs R' R' is again increased or set for another operation.

In the complete and practical construction of my machine the ways K K are adjustably mounted upon a frame K¹⁹, fixedly secured to the main frame A of the machine. This is done through the medium of bolt-and-nut devices K²¹, as shown in Figs. 1 and 3, and by adjusting these bolt-and-nut devices the ways K can be brought closer to or farther from the frame K¹⁹, as conditions may make desirable. To brace the frame K¹⁹, I provide a series of cross-rods K²¹ K²², the lower one K²² of which is bent semicircular, as shown in Fig. 1, so as not to interfere with the discharge of the shock to the ground.

Briefly, the operation of my invention is as follows: The grain is cut by any suitable cutting mechanism and fed into the receptacle by the elevator-mechanism chains E⁴ and laid lengthwise therein, the receptacle being in the position shown in Fig. 1, with the top gates M M being open. As soon as the receptacle has become filled the cam G⁴ shifts the connecting-gears to cause the receptacle-gears to operate to turn the receptacle in a vertical position. As this is being done the end gate M² is opened by having its latch shifted by the member K³, and as the receptacle moves toward its vertical position the bottom gates M' M' will be open by reason of the gears N' coming into mesh with the rack portions N³. It should be understood, however, that immediately the receptacle begins to turn to its vertical position the upper gates M M are closed by reason of the gears N being in engagement with their respective rack portions N². As the apparatus passes onward the receptacle will leave the grain standing, it being understood that the attendant has tied the grain into a shock before the same has left the receptacle. As soon as the receptacle has left the standing grain the cam G⁴ will become disengaged from the shaft C', and the spring $c^6$ will then again shift the gears so that the receptacle will be returned to its vertical position, the bottom gates closing as the receptacle starts on its return movement and the top gates opening as the receptacle reaches a horizontal position, when the elevator device will again fill the receptacle and the proceeding will be as before.

It will be observed that the action of the complete mechanism is entirely automatic, and the several parts are so combined to effect the intermediate operations of elevating the bundles, receiving them in the receptacle H, oscillating the holder to dump and stand the shock in a positive and effective manner.

While the general arrangement of the details of construction shown and described present a preferred arrangement of parts for accomplishing the desired results, yet it will be understood that the said details may be modified or varied without departing from the principle of my invention and the scope of the appended claims.

Having thus described my invention, what I claim, and desire to secure by Letters Patent, is—

1. In a shocking-machine as described; an oscillating bundle-receiver including a pair of upper hinged gates and a pair of lower hinged gates, means controlled by the forward movement of the machine for first closing the upper gates and tilting the receiver to a vertical position and then opening the lower gates as the receiver reaches its vertical position and again closing said lower gates while moving the receiver to its horizontal position.

2. In a machine as described; the combination with a bundle-elevating means and mechanism for actuating the same controlled by the machine drive-axle, a vertically-tiltable bundle-receiver, stop devices for normally supporting it at its horizontal or receiving position, an actuating mechanism for imparting an intermittent movement to the receiver in reverse directions, the bundle-elevating mechanism including means for coöperatively connecting the bundle-receiver-actuating mechanism with the elevator devices, and trip members for releasing the receiver-supporting stop devices controlled by the said receiver-actuating mechanism, as set forth.

3. A machine as described including elevator devices, an oscillating bundle-receiver adapted to receive the bundles as they discharge from the elevator devices, said receiver comprising a pair of hinged upper and a pair of hinged lower gates, automatically-operating means for tilting the receiver, said receiver also including supplemental gate devices for holding the bundles from falling out of the receiver, and automatically-operating means for tripping said supplemental devices to release the bundles as hereinbefore specified.

4. In a machine as described; the combination with the main frame, the elevating devices, the ground-wheel axle, and mechanism actuated by the movement of said axle for transmitting differential motion to the elevating devices; of a receiver adapted to collect the bundles discharged from the elevator, said receiver comprising a pair of side bars each having a stub-axle journaled in the main frame, a pair of segmental-shaped gates hinged to the upper edges of the bars, a similar-shaped pair of lower gates hinged to the lower edges of the bars, actuating mechanism for opening and closing the said gates alternately as the receiver is oscillated, mechanism geared with one of the stub-axles on the receiver for rocking the same at predetermined times, and intermediate connections joining said gear mechanism with the means for transmitting motion to the elevating devices, said connections including automatically-shiftable clutch devices, for the purposes specified.

5. In a machine as described; in combination with the main frame; a bundle receiver and dumper comprising top and bottom portions, each portion consisting of a pair of independently-operating hinged gates, a rocking shaft for each gate which forms the hinged member to which the gate portions are fixedly secured, each of said shafts having a mutilated bevel-gear, segmental guides secured to the main frame, each having a plurality of alternately smooth and rack-grooved surfaces for coöperating with the mutilated gears on the hinged shafts, and means coöperatively joined with and operated from the ground-wheel axle of the machine for imparting an intermittent oscillation to the bundle-receiver, for the purposes described.

6. In a machine as described; an oscillating bundle receiving and dumping means, and the ground-wheel axle; of a mechanism for effecting an intermittent oscillation of the said bundle receiving and dumping means, such mechanism including coöperative mutilated gears, a continuously-rotating shaft geared with the ground-wheel axle, and a shaft-clutch mechanism for controlling the mutilated gears, and means also driven through the ground-wheel-axle movement for shifting the continuously-rotating shaft and the clutch mechanism whereby to set into an operative motion either of the coöperative mutilated gears for oscillating the bundle receiving and dumping means, as set forth.

7. In a machine as described; the combination with the main frame, the oscillating bundle-receiver, said receiver including side bars $H'$ having stop portions $o$, means for actuating the oscillating bundle-receiver controlled by the forward motion of the machine, said actuating mechanism including the wheel having an annular groove $P$ and a radial notch $Q$ and the sliding shaft $C$ and clutch member $C^3$; of the shifting bar $P^4$ and the crank-arms $P^2$ pivotally connected with the clutch $C^3$, one of the crank-arms $P^2$ being also pivotally joined to the bar $P^4$, and the catch $P'$ having a stud member $P^\times$ for engaging the groove $P$ and the notch $Q$ and the wheel $F$, all being arranged substantially as shown and for the purposes described.

8. In a machine as described, an oscillating receiver, means actuated from the ground-wheel axle for oscillating the same to and from a vertical position, an elevator for discharging the bundles into the receiver, and differential-speed mechanism coöperatively joined with the elevator, including devices for reducing the speed of the elevator when the receiver is moving to its vertical position.

EDWARD A. MAINGUET.

Witnesses:
C. R. CLINE,
F. C. MITCHELL.